US008355580B2

(12) United States Patent
Chen

(10) Patent No.: US 8,355,580 B2
(45) Date of Patent: Jan. 15, 2013

(54) METHOD AND SYSTEM FOR GENERATING BOUNDARY IN THE PROCESS OF RASTERIZING VECTOR GRAPHIC AS WELL AS METHOD FOR PRODUCING THE SYSTEM

(75) Inventor: Ken Chen, Beijing (CN)

(73) Assignees: Peking University Founder Group., Ltd., Beijing (CN); Peking University, Beijing (CN); Beijing Founder Electronics Co., Ltd., Beijing (CN)

( * ) Notice: Subject to any disclaimer, the term of this patent is extended or adjusted under 35 U.S.C. 154(b) by 600 days.

(21) Appl. No.: 12/521,202

(22) PCT Filed: Dec. 25, 2007

(86) PCT No.: PCT/CN2007/003769
§ 371 (c)(1),
(2), (4) Date: Jan. 13, 2010

(87) PCT Pub. No.: WO2008/092337
PCT Pub. Date: Aug. 7, 2008

(65) Prior Publication Data
US 2010/0111437 A1    May 6, 2010

(30) Foreign Application Priority Data
Dec. 26, 2006  (CN) .......................... 2006 1 0169645

(51) Int. Cl.
*G06K 9/34* (2006.01)
(52) U.S. Cl. ........................................ 382/199; 382/173
(58) Field of Classification Search .................. 382/199,
382/254, 266, 181, 195, 190, 232, 242, 173,
382/177, 166, 162; 345/418, 611, 613, 441,
345/501, 519, 467, 471, 545, 530; 715/200,
715/209, 762, 763, 700, 800; 358/1.18, 1.1
See application file for complete search history.

(56) References Cited

U.S. PATENT DOCUMENTS
6,792,071 B2 *  9/2004  Dewaele .......................... 378/62
7,817,152 B2 * 10/2010  Kokojima ..................... 345/470
(Continued)

FOREIGN PATENT DOCUMENTS
CN           1707502         12/2005

OTHER PUBLICATIONS

Li, Wei-qing, "Interactive Extracting Raster Element and Rasterizing Vector", Journal of Zhejiang University, Mar. 2001, pp. 231-236, vol. 28, No. 2.

*Primary Examiner* — Sheela Chawan
(74) *Attorney, Agent, or Firm* — The Webb Law Firm

(57) ABSTRACT

The invention discloses a method and a system for generating a boundary in the process of rasterizing a vector graphic as well as a method for producing the system and a method for clipping the vector graphic. The method for generating a boundary includes: segment-polylining the vector graphic and obtaining data of the line segments; obtaining data of the end pixels according to the data of the line segments; obtaining data of boundary pixels according to the data of the end pixels and the relationship between the data of the end pixels; obtaining bitmap data of the boundary pixels according to the data of the boundary pixels. The algorithm used in the invention is very simple and efficient; at the same time, the generation of the bitmap data of the boundary pixels can be carried out synchronously with the generation of bitmap data of the graphic itself. The invention can be used to be combined with a variety of scan line filling algorithms and the bitmap information of the boundary pixels can be obtained synchronously and efficiently in the process of rasterizing a vector graphic so that the quality of the output bitmap can be improved and controlled accurately.

13 Claims, 7 Drawing Sheets

U.S. PATENT DOCUMENTS

| | | |
|---|---|---|
| 7,831,107 B2 * | 11/2010 | Dai et al. .................. 382/266 |
| 2004/0263516 A1 | 12/2004 | Michail et al. |
| 2005/0063596 A1 * | 3/2005 | Yomdin et al. ............. 382/232 |
| 2005/0276519 A1 | 12/2005 | Kitora et al. |

* cited by examiner

METHOD AND SYSTEM FOR GENERATING BOUNDARY IN THE PROCESS OF RASTERIZING VECTOR GRAPHIC AS WELL AS METHOD FOR PRODUCING THE SYSTEM

FIELD OF THE INVENTION

The invention relates to a technology for processing a graphic, an image and characters which belongs to a prepress field, and specifically, relates to a method and a system for generating a boundary in the process of rasterizing a vector graphic as well as a method for producing the system and a method for clipping the vector graphic.

BACKGROUND OF THE INVENTION

A vector graphic is a page description object which has been widely used in the prepress field. The vector graphic can be used to revert the original intention of a describer accurately since it has high fidelity during the coordinate transformation. Characters are another page description object which has been widely used in the prepress field, and the internal description data of which are also based on the vector graphic. Therefore, the rasterization of the vector graphic is a core procedure of the whole prepress output system.

The main task of rasterizing a vector graphic is to convert a vector description in a user coordinate space into bitmap information in a device coordinate space. After the conversion into the bitmap information, the generated bitmap information can then be further processed by using a back-end device to improve the quality of the final output bitmap, and during this procedure the boundary information of the graphic is very helpful to the application of the procedure. Therefore, if certain pixels are known to be the boundary pixels of a vector graphic, these pixels can be processed specially so that the output quality of the vector graphics can be improved and a distortion phenomenon of the graphic which may occur on the boundary can be compensated. Based on the similar principle, if certain pixels are known to be the boundary pixels of a character, these pixels can also be processed specially so that the output quality of the character with a low resolution can be improved.

In a black-white binarized bitmap, the boundary means the set of the boundary pixels, whereas a boundary pixel is a black pixel, and at least one of the four pixels adjacent to said black pixels at the upper side, the lower side, the left side and the right side is a white pixel. In accordance with such a definition, the method of performing determination pixel-by-pixel is employed to generate a boundary in the related art, but this method has a deficiency that much more storage space and computation time has to be occupied and the implementation efficiency is very low. Meanwhile, in a practical situation, for the risk is higher when generate the boundary by modifying the core algorithm for rasterizing directly, in the related art, generally, the generation of the boundary is not performed until the vector graphic has been rasterized. However, since the quantity of bitmap data is large at this time, the processing of the bitmap data consumes a great amount of space and time resource, and the efficiency is very low. The effect obtained in the quality improvement, view as a whole, is not enough to counteract the reduction in the processing speed, thus this method is hard to be applied to practical production. At present, with the large increasing in the speed of a back-end output device, a quick and effective method for generating a boundary is imminently required.

However, there is not a technology for generating a boundary which can meet these requirements in the related art.

SUMMARY OF THE INVENTION

The invention provides a method and a system for generating a boundary in the process of rasterizing a vector graphic as well as a method for producing the system and a method for clipping the vector graphic so that the boundary is generated effectively in the process of rasterizing the vector graphic, and further, the corresponding boundary is generated effectively while the rasterization of the vector graphic is realized.

The invention provides a method for generating a boundary in process of rasterizing a vector graphic, the method includes:

Segment-Polylining the vector graphic and obtaining data of line segments;

obtaining data of end pixels according to the data of the line segments;

obtaining data of boundary pixels according to the data of the end pixels and the relationship between the data of the end pixels; and obtaining bitmap data of the boundary pixels according to the data of the boundary pixels.

Preferably, the data of the end pixels are coordinate values of the end pixels.

Preferably, the coordinate values are the coordinate values in a device space.

Preferably, it is determined, according to a black-white state described by the data of the line segments, whether the data of the end pixels are to be acquired, and the data of the end pixels are acquired according to the black-white state described by the data of the line segments.

Preferably, when a line segment described by the data of the line segments is full white, the data of the end pixels are not acquired; when a line segment described by the data of the line segments is full black, the data of both end pixels of the line segment are acquired; and when a line segment described by the data of the line segments is a line segment in which black and white are mixed, data of the end pixels of the black segments are acquired.

Preferably, the data of the boundary pixels are obtained by intersecting, unifying and complementing according to the data of the end pixels and the relationship between the data of the end pixels.

Preferably, the step of obtaining the data of the boundary pixels includes: using a width of the current bar as a line width and intersecting a set of black end pixels in this line and a set of white end pixels in a neighboring line, so as to use the black end pixels in the resultant intersection set as the boundary pixels.

Preferably, the step of obtaining bitmap data of the boundary pixels is carried out synchronously with the process of rasterizing the vector graphic.

Preferably, the data of the boundary pixels are coordinate values of the boundary pixels.

Preferably, the segment-polylining is to zigzag the vector graphic to be rasterized, decompose the vector graphic into groups of vectors of zigzag line segments, execute a scan line intersecting operation on the vectors of the zigzag line segments, and solve out the data of the line segments.

Preferably, the method further includes: clipping the bitmap of the boundary pixels and putting the clipped bitmap into a final page bitmap.

The invention also provides a system for generating a boundary in the process of rasterizing a vector graphic, the system includes a line segment acquirement module which is used to zigzag the vector graphic and acquire data of line segments, the system further includes:

an end pixel acquirement module which is used to acquire data of end pixels according to the data of the line segments;

a boundary pixel acquirement module which is used to acquire data of boundary pixels according to the data of the end pixels and the relationship between the data of the end pixels; and a bitmap acquirement module which is used to acquire bitmap data of the boundary pixels according to the data of the boundary pixels.

Preferably, the end pixel acquirement module is further used to determine, according to a black-white state described by the data of the line segments, whether the data of the end pixels are to be acquired, and to acquire the data of the end pixels according to the black-white state described by the data of the line segments.

Preferably, the end pixel acquirement module is further used in such a manner that when a line segment described by the data of the line segments is full white, the data of the end pixels are not acquired; when a line segment described by the data of the line segments is full black, the data of both end pixels of the line segment are acquired; and when a line segment described by the data of the line segments is a line segment in which black and white are mixed, the data of the end pixels of the black segments are acquired.

Preferably, the boundary pixel acquirement module is further used to use a width of the current bar as a line width and intersect a set of black end pixels in this line and a set of white end pixels in a neighboring line, so as to use the black end pixels in the resultant intersection set as the boundary pixels.

The invention also provides a method for producing a system for generating a boundary in the process of rasterizing a vector graphic, the method includes:

providing a line segment acquirement module which is used to zigzag the vector graphic and acquire data of line segments;

providing an end pixel acquirement module which is connected to the line segment acquirement module and is used to acquire data of end pixels according to the data of the line segments;

providing a boundary pixel acquirement module which is connected to the end pixel acquirement module and is used to acquire data of boundary pixels according to the data of the end pixels and the relationship between the data of the end pixels; and providing a bitmap acquirement module which is connected to the boundary pixel acquirement module and is used to acquire bitmap data of the boundary pixels according to the data of the boundary pixels.

The invention also provides a method for clipping a vector graphic, the method includes:

acquiring a boundary bitmap of the current clipping border;

unifying the boundary bitmap of the current clipping border and the boundary bitmap of the current graphic, and obtaining a boundary bitmap of the current graphic outer border; and intersecting the boundary bitmap of the current graphic outer border and the bitmap of the current graphic itself.

The invention has the following advantages.

Since intersecting, unifying and complementing and the like employed in the invention are the most basic set operations, the algorithm can be realized simply and effectively. Further, since generating a boundary by using the relationship between bitmap data of black and white segments in adjacent lines sufficiently is established on the bitmap data, the generation of the bitmap data of the boundary pixels can be carried out synchronously with the generation of bitmap data of the graphic itself. The invention can also perform further optimization by utilizing the internal repetitiveness of the inter-line data to reduce the amount of computation and increase the parallelism. Therefore, the invention can be used to be combined with a variety of scan line filling algorithms, and the bitmap information of the boundary pixels can be obtained synchronously and efficiently in the process of rasterizing a vector graphic so that the quality of the output bitmap can be improved and controlled accurately.

DETAILED DESCRIPTION OF THE PREFERRED EMBODIMENTS

A specific implementation of the invention will be described below with reference to the accompanying drawings.

The invention conceives that when a vector graphic is rasterized, bitmap data can be obtained; at this time, a series of the line segments can be obtained through the segment-polylining process performed when the vector graphic is rasterized. At first, the invention obtains values of the end pixels by use of the state represented by two colors of black and white after line segment filling, then, the end pixels as boundary pixels can be obtained through simple technical means such as intersecting and unifying by using the law of adjacent relationship between the boundary pixels. The set of the end pixels solved out is a set of the boundary pixels necessarily. The invention also contributes to such aspect that the set of the boundary pixels is obtained through simple operations such as intersecting and unifying using the same bitmap data while the bitmap is acquired by rasterizing the vector graphic in the related art. That is, the invention obtains another processing result while a processing result of the flow of a main routine is used without affecting the running of the main routine. Thus, not only the requirement of generating a boundary quickly and effectively can be met, but also the generation of the boundary simultaneous with the generation of the bitmap can be achieved. Obviously, in the invention, asynchronous execution is also possible, but the implementation efficiency of it is low.

The concept of the invention will be set forth further in connection with a specific embodiment of the invention.

Figure 1:
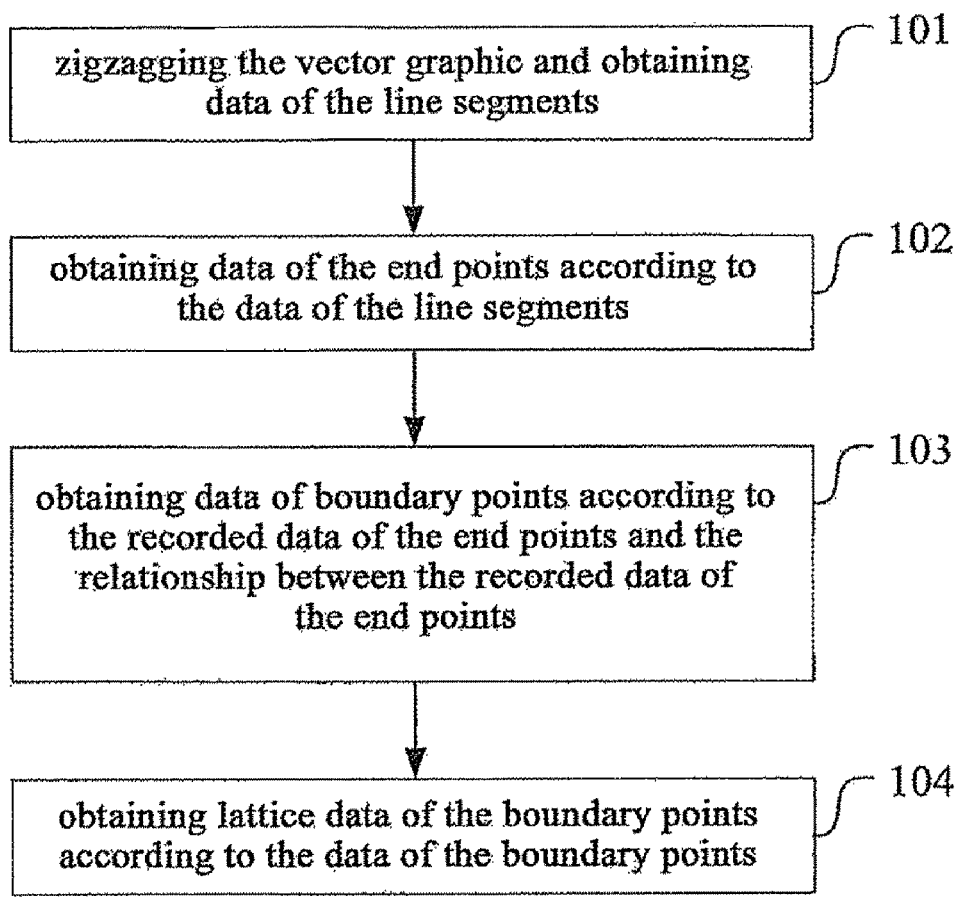
FIG. 1 is a schematic diagram showing a flow chart of a method for generating a boundary according to an embodiment.

FIG. 1 is a schematic diagram showing a flow chart of a method for generating a boundary. As shown in the drawing, the method for generating a boundary includes the following steps:

Step 101, segment-polylining the vector graphic and obtaining data of the line segments.

This step includes segment-polylining the vector graphic, decomposing the vector graphic into a series of groups of vectors of zigzag line segments, executing a scan line intersecting operation on each one of the vectors of zigzag line segments located in a filling region, and recording the result in line segment description data. In this procedure, the number of bars constituting continuous regions into which the vector graphic has been divided is determined depending on the size of the vector graphic.

Step 102, obtaining data of the end pixels according to the data of the line segments.

The data of the end pixels may be coordinate values of the end pixels, and in particular, may be coordinate values in a device space. In implementation, in consideration of the factors such as specific application environment and requirement of the operations, implementation is set to be performed by "bars", each of which includes a number of line segments. Apparently, one vector graphic to be processed is composed of a number of bars. Thus, the following processing is performed on each of the bars in an unit of bar in connection with the black-white state of the line segments:

(1) fetching the data of the line segments in the current bar;

(2) if there is not any line segment in the current bar, a bitmap of full black or full white will be obtained after the bar is filled. As for the case of full white, no boundary information is produced; as for the case of full black, data of black end pixels are recorded.

(3) if there are line segments in the current bar, these line segments are processed sequentially. Information of black and white segments is calculated according to the line segment description data. When the line segments described by the line segment data are line segments in which black and white are mixed, data of the end pixels of the black segments are recorded. The case in which black and white are mixed refers to a case in which an entirety is neither full black nor full white, but a portion of data are black pixels, while another portion of data are white pixels.

Step 103, obtaining data of boundary pixels according to the recorded data of the end pixels and the relationship between the recorded data of the end pixels.

In the implementation, a unit of "line" is introduced with a width of the current bar as the line width, and each line includes a number of black and white end pixels.

It is known from the definition of the boundary pixels that the end pixels as the boundary pixels can be obtained by an adjacent relationship. That is, one black end pixel is an upper boundary pixel, and when and only when the adjacent pixel above the black end pixel is a white end pixel, the black end pixel is a boundary pixel. Consequently, a set of upper boundary pixels of one line can be obtained by intersecting a set of black end pixels in the one line and a set of white end pixels in a line above the one line, and in a similar way, a set of lower boundary pixels of one line can be obtained by intersecting a set of black end pixels in the one line and a set of white end pixels in a line under the one line. Since the set of black end pixels and the set of white end pixels are complementary sets to each other, the set of white end pixels can be obtained by complementing the set of black end pixels. A set of left boundary pixels and a set of right boundary pixels of one line are represented automatically in such a manner as being described by coordinates of black and white segments, and need not to be calculated any more. Then, a set of the boundary pixels of one line can be obtained by unifying the set of upper boundary pixels, the set of lower boundary pixels, the set of left boundary pixels and the set of right boundary pixels. If each line is operated according to this step, the boundary pixels in the current bar are obtained. In implementation, as an example, the processing is carried out line by line in an up-to-down order, and it is obvious that the same result can be obtained by performing the processing in a left-to-right order.

Step 104, obtaining bitmap data of the boundary pixels according to the data of the boundary pixels.

The above calculation is repeated on each piece of datum sequentially, and then a boundary bitmap of the whole graphic can be obtained. It is obvious that in implementation, the acquired data of the boundary pixels mean coordinate values of the boundary pixels.

Figure 2:
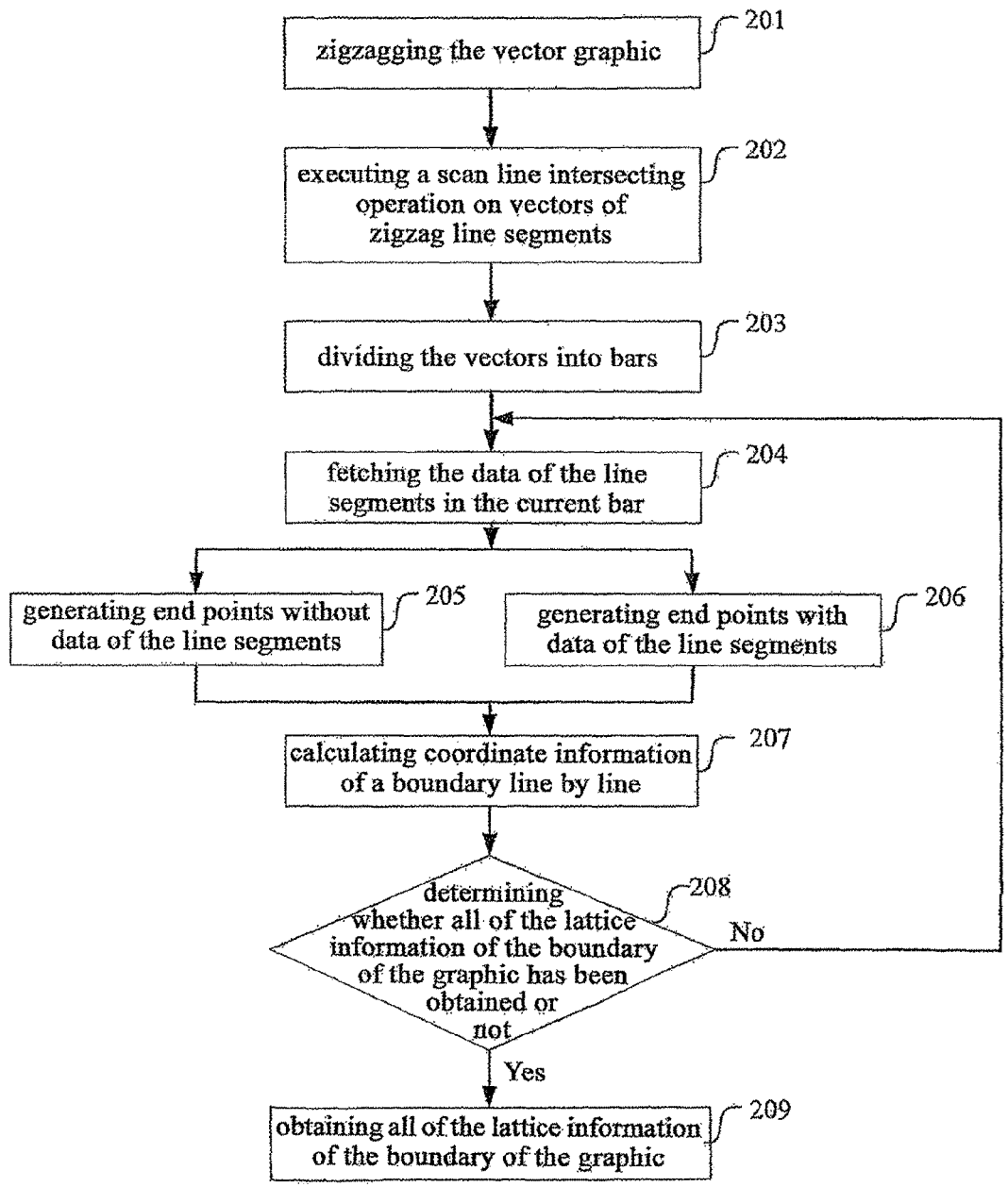
FIG. 2 is a schematic diagram showing a specific flow chart of the method for generating a boundary according to the embodiment.

In order to further describe implementation of the invention, another specific embodiment of a method for generating a boundary will be exemplified below. FIG. 2 is a schematic diagram showing a specific flow chart of the method for generating a boundary. As shown in the drawing, the method for generating a boundary can be implemented according to the following steps:

Step 201, segment-polylining the vector graphic;

Step 202, executing a scan line intersecting operation on vectors of zigzag line segments;

Step 203, dividing the vectors into bars;

Step 204, fetching the data of the line segments in the current bar;

Step 205, generating end pixels without data of the line segments;

Step 206, generating end pixels with data of the line segments;

Step 207, calculating coordinate information of a boundary line by line;

Step 208, determining whether all of the bitmap information of the boundary of the graphic has been obtained or not;

Step 209, obtaining all of the bitmap information of the boundary of the graphic.

Figure 3:
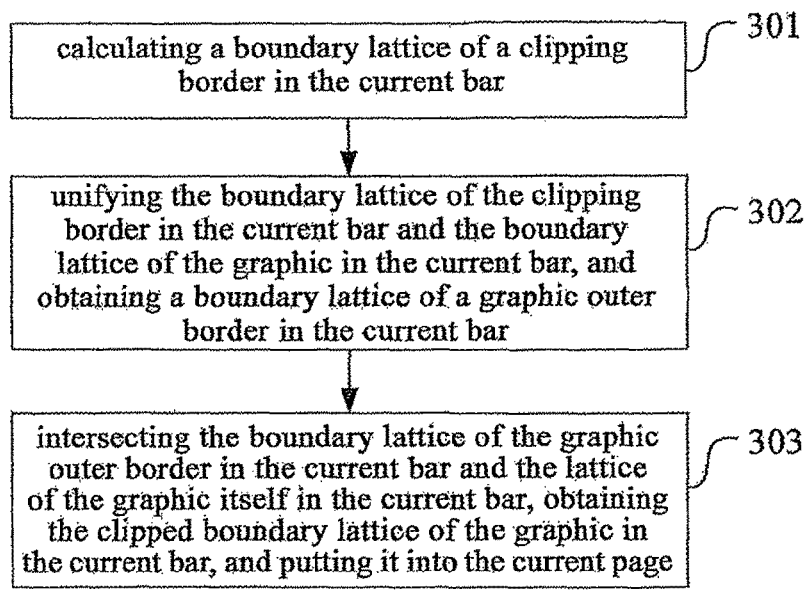
FIG. 3 is a schematic diagram showing a flow chart of the method for generating a boundary of a clipped graphic according to the embodiment.

The invention also provides a method for clipping a vector graphic. "Clipping" is an operation to be performed when the bitmap obtained by rasterization is finally put into the current page, and it is an important step to obtain the final page bitmap. The bitmap obtained by rasterization can be put into a page only if it is subject to the processing of "clipping". Further, a "clipping" region is also described by the vector graphic. The bitmap which is finally put into the current page is the result of intersecting a bitmap of the vector graphic itself and a bitmap of the "clipping" region. A specific embodiment of the method for clipping the vector graphic will be described below; meanwhile, how the clipped boundary bitmap is put into the final page bitmap is described in connection with the boundary bitmap obtained in the aforementioned implementation. FIG. 3 is a schematic diagram showing a flow chart of the method for generating a boundary for a clipped graphic, in which a graphic means a specific example of a graphic and the clipped graphic is composed of "bars". That is, an implementation in which a boundary bitmap of the clipped graphic is put into the current page in a unit of "bar" will be further described. As shown in the drawing, the method for generating a boundary can be implemented in the following steps:

Step 301, calculating a boundary bitmap of a clipping border in the current bar.

The vectors in a buffer area for clipping vectors are rasterized sequentially, and a boundary bitmap of the vectors is obtained while a bitmap of the vectors themselves is obtained according to the implementation method shown in FIG. 1. All of the bitmap of the clipping vectors themselves in the current bar are intersected, and all of the boundary bitmap of the clipping vectors in the current bar are unified, then the two results of the two operations are intersected so that the boundary bitmap of the clipping border in the current bar is obtained.

Step 302, unifying the boundary bitmap of the clipping border in the current bar and the boundary bitmap of the graphic in the current bar, and obtaining a boundary bitmap of a graphic outer border in the current bar.

Step 303, intersecting the boundary bitmap of the graphic outer border in the current bar and the bitmap of the graphic itself in the current bar, obtaining the clipped boundary bitmap of the graphic in the current bar, and putting it into the current page.

Figure 4:
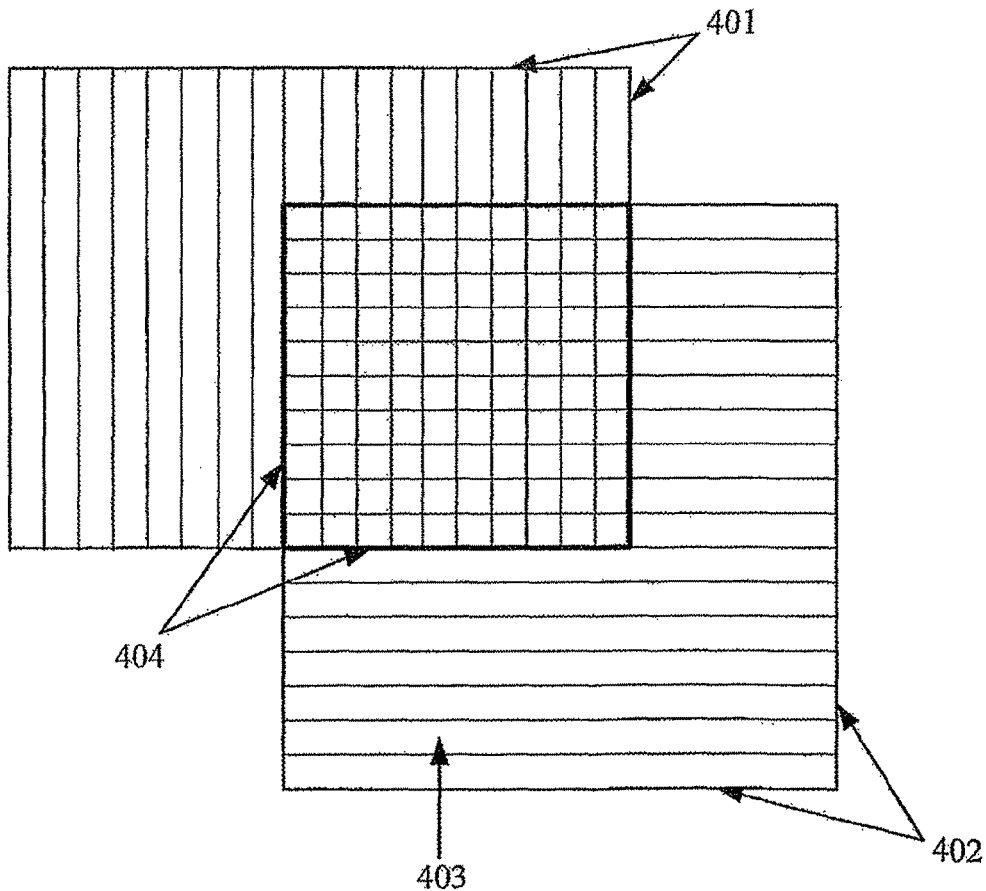
FIG. 4 is a schematic diagram showing a relationship between the clipping and a boundary bitmap of the graphic in the embodiment.

FIG. 4 is a schematic diagram showing a relationship between the clipping and a boundary bitmap of the graphic. As shown in the drawing, a border 401 of a rectangular region with vertical stripes is a boundary bitmap of a dipping border; a border 402 of a rectangular region with horizontal stripes is a boundary bitmap of a graphic; a rectangular region 403 with horizontal stripes is a bitmap of the graphic itself; and a border 404 of a rectangular region in which the vertical stripes and the horizontal stripes are crossed is the clipped boundary bitmap of the graphic.

Based on the same inventive concept, the invention also provides a system for generating a boundary in process of rasterizing a vector graphic. A specific implementation of the system will be described below in connection with the accompanying drawings.

Figure 5:
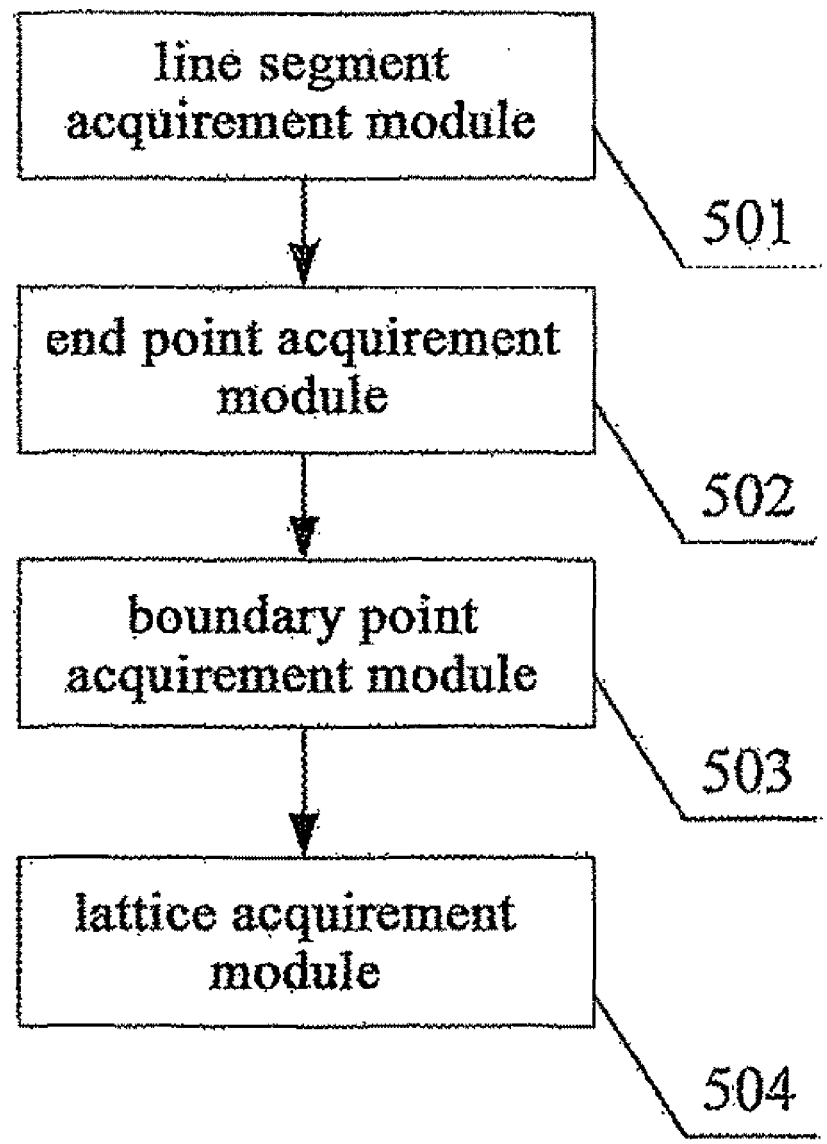
FIG. 5 is a schematic structural diagram of a system for generating a boundary in the process of rasterizing a vector graphic according to the embodiment.

FIG. 5 is a schematic structural diagram of a system for generating a boundary in the process of rasterizing a vector graphic. As shown in the drawing, the system includes: a line segment acquirement module 501; an end pixel acquirement module 502 which is connected to the line segment acquirement module 501; a boundary pixel acquirement module 503 which is connected to the end pixel acquirement module 502; and a bitmap acquirement module 504 which is connected to the boundary pixel acquirement module 503, wherein:

The line segment acquirement module zigzags the vector graphic being rasterized and obtains data of the line segments. The end pixel acquirement module acquires data of the end pixels according to the data of the line segments. The boundary pixel acquirement module acquires data of the boundary pixels according to the data of the end pixels and the relationship between the data of the end pixels. The bitmap acquirement module acquires bitmap data of the boundary pixels according to the data of the boundary pixels.

The end pixel acquirement module can acquire the data of the end pixels according to the black-white state of the data of the line segments. The end pixel acquirement module does not acquire the data of the end pixels when a line segment described by the data of the line segments is full white, acquires data of both end pixels of a line segment described by the data of the line segments when the line segment is full black, and acquires data of the end pixels of the black segments when a line segment described by the data of the line segments is a line segment in which black and white are mixed.

The boundary pixel acquirement module acquires the data of the boundary pixels by intersecting and unifying according to the data of the end pixels and the adjacent relationship between the data of the end pixels. The boundary pixel acquirement module can use a width of the end pixels as a line width and can intersect a set of black end pixels in this line and a set of white end pixels in a neighboring line, so as to use the black end pixels in the resultant intersection set as the boundary pixels.

Figure 6:
FIG. 6 is a schematic diagram showing the effect of the bitmap of one vector graphic itself after it is rasterized in the embodiment.
Figure 7:
FIG. 7 is a schematic diagram showing the effect of outputting the boundary bitmap by using the invention in the embodiment.

The invention provides a method and a system for generating a boundary which can generate bitmap information of the corresponding boundary effectively while realizing the rasterization of the vector graphic so that the is quality of the output bitmap can be improved and controlled more accurately. FIG. 6 is a schematic diagram showing the effect of the bitmap of one vector graphic itself after it is rasterized. FIG. 7 is a schematic diagram showing the effect of outputting the boundary bitmap by using the invention. The prominent effect produced by employing the invention can be seen visually from these two drawings.

Based on the same inventive concept, the invention also provides a method for producing the system for generating a boundary in process of rasterizing a vector graphic. A specific implementation of the method will be described below in connection with the accompanying drawings.

Figure 8:
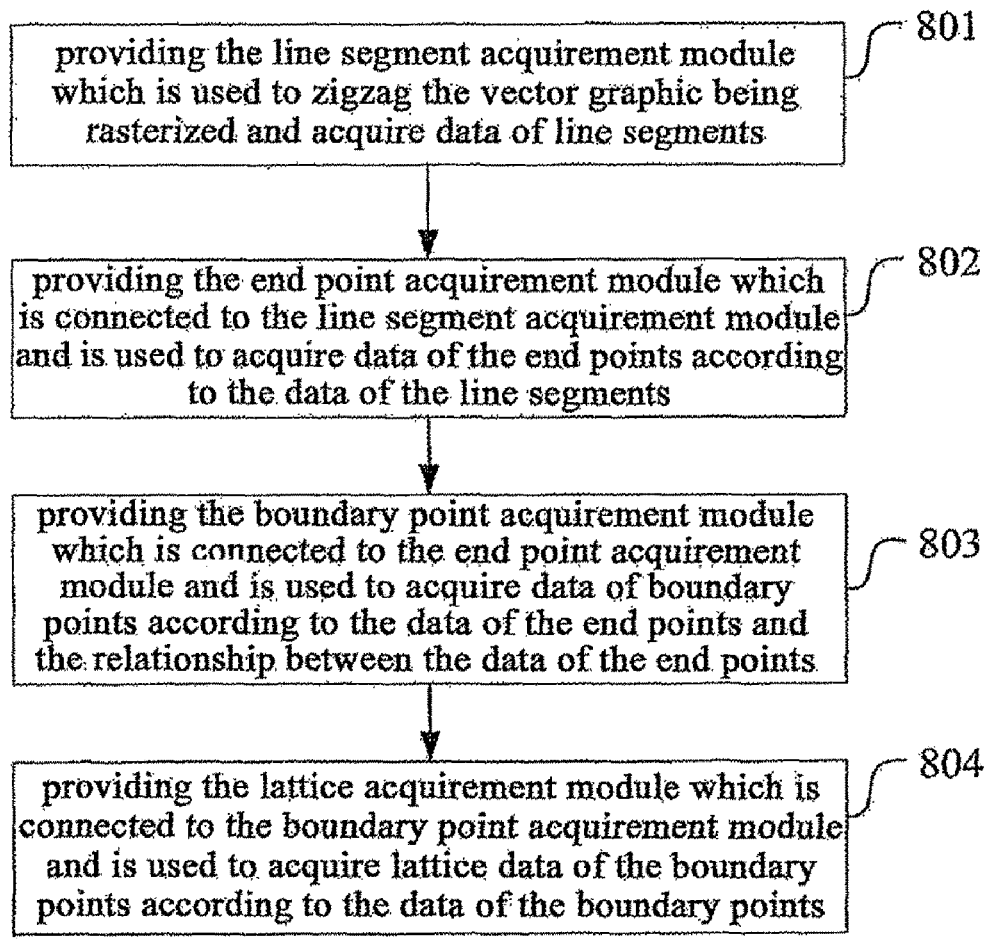
FIG. 8 is a schematic diagram showing a flow chart of a method for producing the system for generating a boundary in the process of rasterizing the vector graphic according to the embodiment.

FIG. 8 is a schematic diagram showing an implementation flow of a method for producing the system for generating a boundary in the process of rasterizing the vector graphic. As shown in the drawing, the method includes the following steps:

Step 801, providing the line segment acquirement module which is used to zigzag the vector graphic being rasterized and acquire data of line segments;

Step 802, providing the end pixel acquirement module which is connected to the line segment acquirement module and is used to acquire data of the end pixels according to the data of the line segments;

Step 803, providing the boundary pixel acquirement module which is connected to the end pixel acquirement module and is used to acquire data of boundary pixels according to the data of the end pixels and the relationship between the data of the end pixels;

Step 804, providing the bitmap acquirement module which is connected to the boundary pixel acquirement module and is used to acquire bitmap data of the boundary pixels according to the data of the boundary pixels.

The spirit of the invention consists in that a boundary is generated using a simple mathematical treatment by means of the bitmap data obtained by rasterizing a vector graphic according to law between the boundary pixels. Apparently, those skilled in the art can make various changes and modifications to the invention without departing from the spirit and scope of the invention. Thus, if these changes and modifications are within the scope of the invention defined by the following claims and equivalents thereof, the invention is intended to cover these changes and modifications.

What is claimed is:

1. A method for generating a boundary in the process of rasterizing a vector graphic, comprising the steps of:
   segment-polylining the vector graphic;
   obtaining data of line segments;
     obtaining data of end pixels according to the data of the line segments;
     obtaining data of boundary pixels according to the data of the end pixels and the relationship between the data of the end pixels;
     obtaining bitmap data of the boundary pixels according to the data of the boundary pixels; and determining whether to acquire the data of the end pixels according to a black-white state described by the data of the line segments and acquiring the data of the end pixels according to the black-white state described by the data of the line segments.

2. The method of claim 1, wherein the data of the end pixels are coordinate values in a device space.

3. The method of claim 1, wherein when a line segment described by the data of the line segments is full white, the data of the end pixels are not acquired; when a line segment described by the data of the line segments is full black, the data of both end pixels of the line segment are acquired; and when a line segment described by the data of the line segments is a line segment in which black and white are mixed, the data of the end pixels of the black segments are acquired.

4. The method of claim 1, further including obtaining the data of the boundary pixels by intersecting, unifying and complementing according to the data of the end pixels and the relationship between the data of the end pixels.

5. The method of claim 4, wherein the step of obtaining the data of the boundary pixels includes: using a width of the current bar as a line width and intersecting a set of black end pixels in this line and a set of white end pixels in a neighboring line, so as to use the black end pixels in the resultant intersection set as the boundary pixels.

6. The method of claim 1, wherein the step of obtaining bitmap data of the boundary pixels is carried out synchronously with the process of rasterizing the vector graphic.

7. The method of claim 1, wherein the segment-polylining is to zigzag the vector graphic to be rasterized, decompose the vector graphic into groups of vectors of zigzag line segments, execute a scan line intersecting operation on the vectors of the zigzag line segments, and solve out the data of the line segments.

8. The method of claim 1, further including clipping the bitmap of the boundary pixels and putting the clipped bitmap into a final page bitmap.

9. A method for clipping a vector graphic, comprising the steps of:
  acquiring a boundary bitmap of the current clipping border according to the method as cited in claim 1;
  unifying the boundary bitmap of the current clipping border and the boundary bitmap of the current graphic, and obtaining a boundary bitmap of the current graphic outer border; and
  intersecting the boundary bitmap of the current graphic outer border and the bitmap of the current graphic itself.

10. A system for generating a boundary in the process of rasterizing a vector graphic, comprising:
  a line segment acquirement module which is used to zigzag the vector graphic and acquire data of line segments;
  an end pixel acquirement module which is connected to the line segment acquirement module and is used to acquire data of end pixels according to the data of the line segments;
  a boundary pixel acquirement module which is connected to the end pixel acquirement module and is used to acquire data of boundary pixels according to the data of the end pixels and the relationship between the data of the end pixels; and
  a bitmap acquirement module which is connected to the boundary pixel acquirement module and is used to acquire bitmap data of the boundary pixels according to the data of the boundary pixels,
  wherein the end pixel acquirement module is further used to determine whether to acquire the data of the end pixels according to a black-white state described by the data of the line segments and to acquire the data of the end pixels according to the black-white state described by the data of the line segments.

11. The system of claim 10, wherein the end pixel acquirement module is further used in such a manner that when a line segment described by the data of the line segments is full white, the data of the end pixels are not acquired; when a line segment described by the data of the line segments is full black, the data of both end pixels of the line segment are acquired; and when a line segment described by the data of the line segments is a line segment in which black and white are mixed, the data of the end pixels of the black segments are acquired.

12. The system of claim 10, wherein the boundary pixel acquirement module is further used to use a width of the current bar as a line width and intersect a set of black end pixels in this line and a set of white end pixels in a neighboring line, so as to use the black end pixels in the resultant intersection set as the boundary pixels.

13. A method for producing a system for generating a boundary in the process of rasterizing a vector graphic, comprising the steps of:
  providing a line segment acquirement module which is used to zigzag the vector graphic and acquire data of line segments;
  providing an end pixel acquirement module which is connected to the line segment acquirement module and is used to determine whether to acquire the data of the end pixels according to a black-white state described by the data of the line segments and to acquire data of end pixels according to the black-white state described by the data of the line segments;
  providing a boundary pixel acquirement module which is connected to the end pixel acquirement module and is used to acquire data of boundary pixels according to the data of the end pixels and the relationship between the data of the end pixels; and
  providing a bitmap acquirement module which is connected to the boundary pixel acquirement module and is used to acquire bitmap data of the boundary pixels according to the data of the boundary pixels.

* * * * *

UNITED STATES PATENT AND TRADEMARK OFFICE
CERTIFICATE OF CORRECTION

PATENT NO.        : 8,355,580 B2                               Page 1 of 1
APPLICATION NO. : 12/521202
DATED             : January 15, 2013
INVENTOR(S)       : Ken Chen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 799 days.

Signed and Sealed this
First Day of September, 2015

Michelle K. Lee
*Director of the United States Patent and Trademark Office*